Nov. 21, 1939.   G. HARRISON   2,180,823
HOLE SIZING TOOL
Filed May 28, 1938
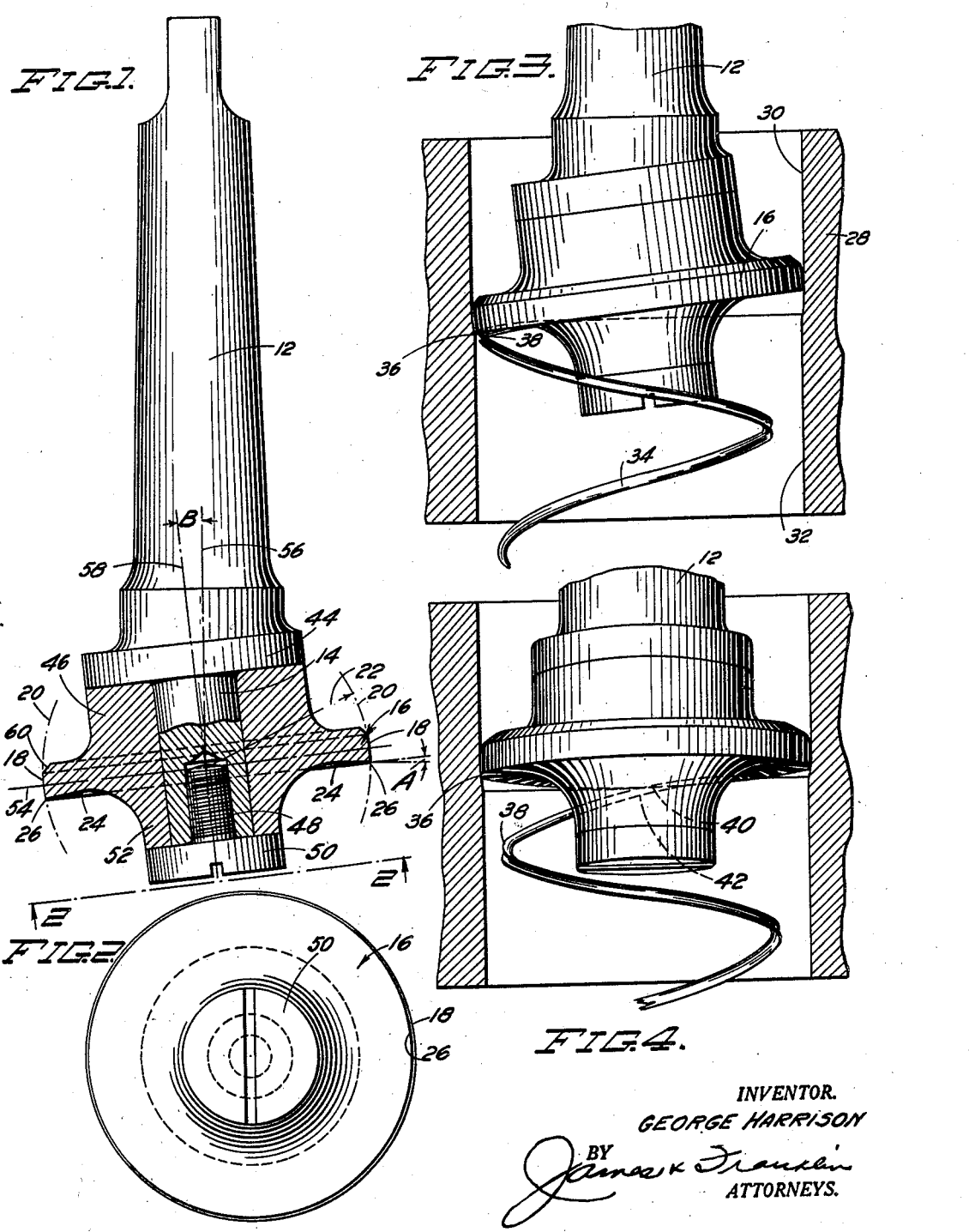
INVENTOR.
GEORGE HARRISON
BY
ATTORNEYS.

Patented Nov. 21, 1939

2,180,823

UNITED STATES PATENT OFFICE 2,180,823

HOLE SIZING TOOL

George Harrison, Toledo, Ohio, assignor to Doehler Die-Casting Co., Toledo, Ohio, a corporation of New York Application May 28, 1938, Serial No. 210,637

14 Claims. (Cl. 29—90)

This invention relates to machine tools and more particularly to a novel hole sizing tool which is used instead of a reamer or broach to finish a cylindrical hole.

The object of my invention is to generally improve machine tools for sizing a hole to final accurate dimension. When a hole is to be accurately finished to size, it has heretofore been the practice to preliminarily drill or bore the hole to nearly but not quite finished dimension, and to thereafter use a reamer or a broach to bring the hole to the exact desired dimension. Difficulty has arisen because of tool marks which may mar the desired smooth surface, and because of "spring" of the metal being worked on, this resulting in a hole which may be imperfect in size or may be out of round. This "spring" is particularly troublesome if an appreciable amount of stock is to be removed during the hole sizing operation, or if the hole being sized is imperfect, as when it has been formed directly in a die-casting operation, without subsequent drilling or boring.

One primary object of my invention is to provide a hole sizing tool which will produce a perfect smooth cylindrical hole having a bright and practically polished surface and which is devoid of tool marks and "spring". Another object is to provide a tool characterized by minimum wear, this resulting from the fact that the cutter of the tool does not rotate within the hole. Another object is to devise a cutter in which wear at the cutting edge is not accompanied by direct loss or change of diameter of the cutter. Still another object is to provide a cutter which has a long cutting edge different parts of which function successively to cut the stock being sized. This is in contrast with a single point cutter and minimizes the production of heat, thus making it unnecessary to use "red hard" steel even at high rates of production. Still another object is to provide a cutter which may be readily resharpened, and which may be repeatedly sharpened without loss of diameter.

In accordance with a further feature and object of the present invention, the cutter pushes the shaving or chip through the unfinished part of the hole ahead of the cutter, thus making it impossible for the shaving or chip to come between the tool and the finished hole, with consequent scratching or marring of the surface of the hole or dulling of the tool. In accordance with further features and objects of the invention, the tool is inexpensive to manufacture compared to a reamer or broach, and in practice may be used even more inexpensively because it comprises a small disk-like cutter detachably mounted on a main shank and cutters of different size may be used on the same shank.

To the accomplishment of the foregoing and such other objects as may hereinafter appear, my invention consists in the tool elements and their relation one to the other, as hereinafter are more particularly described in the specification and sought to be defined in the claims. The specification is accompanied by a drawing, in which:

Fig. 1 is a partially sectioned elevation of a hole sizing tool embodying features of my invention;

Fig. 2 is a bottom plan view looking in the direction of the arrows 2—2; and

Figs. 3 and 4 are explanatory of the operation of the tool.

Referring to the drawing, the tool comprises a shank 12 having a bearing stud 14 formed at one end thereof. A cutter disk 16 is freely rotatably mounted on stud 14. While the disk has been referred to as freely rotatable on the stud, it may be explained that in practice the cutter 16 does not rotate and the stud 14 rotates within the cutter. The cutter 16 has a diameter equal to the desired diameter for the hole to be finished by the tool. The edge wall 18 of the cutter conforms to the diametrical portion of the surface of a sphere indicated by the broken line 20, said sphere having a radius 22 equal to the radius of the finished hole or cylinder to be produced by the tool. The bottom face 24 of the cutter disk is preferably cut at an angle somewhat less than 90° relative to the edge of the disk. More specifically, the face 24 is disposed at a slight angle relative to the plane of the disk, this angle being indicated at A in Fig. 1. This forms a cutting edge 26 at the periphery of the disk.

The bearing stud 14 is disposed at an angle relative to the axis of the shank 12, this angle being indicated at B. Because of this angular disposition of the bearing stud 14, the cutter is given a wobbling motion when the shank 12 is rotated.

The operation of the tool may be described with reference to Figs. 3 and 4 of the drawing. The shank 12 is mounted in the spindle of a drill press or other suitable apparatus. The piece 28 being worked upon is fixedly secured on the table of the drill press with the hole properly centered. The rotating tool is moved downwardly and upon contact with the work the cutter 16 ceases rotation and is wobbled by the rotating shank. In Fig. 3, the upper part 30 of the hole has already been cut to finished size, and the lower part 32 of the hole has yet to be sized. The cutter 16 removes the wall metal and produces a chip which is in the form of a continuous shaving 34. The lowermost part of the cutter, or, more accurately speaking, the part approaching lowermost position, does the cutting in any one instant. In Fig. 3, the lowest point of the cutter is at 36 and this has just produced the shaving 38. In Fig. 4, the shank has turned through 90° and the point 36 of the cutter has been elevated. The point 40 has been moved downwardly and is now the lowest point of the cutter, it producing the shaving indicated at 42. The quarter wobble of the cutter from the position shown in Fig. 3 to the position shown in Fig. 4 has produced the length of shaving indicated between the points 38 and 42 in Fig. 4 of the drawing. Because of the sliding and at all times sloping or biased action of the cutting edge, the shaving is cut away with a peculiar slicing movement which leaves behind it an exceptional smooth and unmarred surface. In fact, the surface is bright and has a polished appearance and an accuracy which has amazed those who have studied the results produced by this tool.

Reverting now to Figs. 1 and 2, I shall describe the tool in greater detail. The shank 12 may be a straight shank for use in a chuck, or it may be a tapered shank, as shown, for use as with a standard reamer. The lower end of the shank is preferably enlarged at 44 to form a thrust bearing face for receiving the thrust of the cutter. The stud 14 is formed integrally with shank 12. The cutter disk 16 is preferably formed integrally with an enlarged hub the upper part 46 of which bears against the thrust wall 44. The hub is made substantial in axial length in order to provide adequate bearing surface for radial thrust by the cutter. The cutter is held on stud 14 by means of a screw 48 threadedly received in stud 14 and having an enlarged cap 50 which bears against the lower part 52 of the hub of the cutter. It will be understood that stud 14 is made slightly greater in length than the cutter, or other provision is made to keep the thrust faces of the enlargement 44 and cap 50 at a separation slightly greater than the length of the cutter hub in order not to interfere with free relative rotation of the cutter and shank. In practice, there is no wear on cap 50, for the thrust is upward against bearing 44.

Theoretically, the cutter disk may be extremely thin and the theoretical disk is indicated by the plane of the broken line 54. It will be observed that the axis 56 of the shank, the axis 58 of the stud, and the plane 54 of the cutter all intersect in a common point.

In actual practice, the cutter is given an appreciable thickness. Supporting stock is provided above plane 54 in order to back up the cutting edge, and sharpening stock is provided below the plane 54 so that the cutter may be resharpened whenever necessary. In order to sharpen the cutter, it is merely necessary to cut or grind away some of the bottom face 24. This presents a freshly sharpened cutting edge at the periphery 26. The sharpening operation does not reduce the diameter of the cutter and it may continue to be used for the same diameter hole.

Because the cutter is of appreciable thickness, instead of being merely a plane, the edge 18 is given a spherical surface, as previously described, and it will be understood that the radius of curvature 22 of the sphere 20 is centered at the point of intersection of plane 54 and center lines 56 and 58.

The shank and cutter are, of course, made of tool steel and are properly hardened and ground, but it is not necessary to use special high speed cutting metals which are "red hard", because the tool operates without generating substantial heat such as might change the temper of ordinary tool steel.

By way of illustration of a specific example of the tool shown in the drawing, the shank 12 has a #4 Morse taper. The cutter 16 and the sphere 20 are 3.002 inches in diameter. The angle A is 3° and the angle B is 5°. The hub of the cutter is two inches in diameter at the thrust bearing surface and is an inch and a half long at the radial bearing surface on stud 14. The thickness of the cutter at the spherically ground edge is $\tfrac{1}{16}''$, half of this thickness being disposed on each side of the theoretical plane of the cutter. This does not include the champfer at 60.

The said tool was designed primarily for finishing the die-cast cylinder of a gasoline pump, and is used on the workpiece as it comes directly from the die. A substantial amount of metal is removed from the original die-cast hole, and the rough hole is characterized by projections and irregularities, yet the finished cylinder is perfectly true and highly polished. A heavy cut may be taken, insuring rapid production.

The tool has also been used with equal success on steel and iron, and it is not at all limited to soft die-cast metals. If the tool is to be used at extremely high speeds, or for heavy cuts, and particularly on harder metal, it is desirable to use anti-friction radial and thrust bearings. These have not been shown in the drawing, and for ordinary purposes, and particularly when working on die castings, the anti-friction bearings are unnecessary.

It is believed that the construction and operation, as well as the many advantages of my improved hole sizing tool will be apparent from the foregoing detailed description thereof. The wear of the tool is minimized because there is no rotation of the cutter. Furthermore, the cutter is not a single point cutter but has a long peripheral cutting edge and the point of cutting changes continually and progressively around the periphery of the cutter. Most of the periphery of the cutter is idle and is permitted to cool between the instants of actual functional cutting. This makes it possible to use ordinary tool steel. The tool is readily resharpened and there is no loss of diameter when the tool is resharpened. There is also little or no loss of diameter resulting from wear during operation because of the absence of rotation of the cutter within the hole. The tool remains sharp for a long time because it need not work against the chip or shaving, the latter being pushed downwardly ahead of the tool at all times. This same feature prevents marring or scratching of the smooth finished surface of that part of the hole which has already been treated.

The tool is inexpensive to make compared to a reamer or broacher, and in practice proves to be even more inexpensive for the reason that one size shank may be used with a substantial number of cutters of different size, it being a simple matter to remove screw 48 in order to change the cutter. This brings the cost of the tool down to practically the cost of the cutter alone, and this is obviously a small, inexpensive, and readily manufactured part.

It will be apparent that while I have shown and described my invention in a preferred form, many changes and modifications may be made in the structure disclosed without departing from the spirit of the invention defined in the following claims. It will be understood that this tool in common with other reamers, drills and the like, may be used by rotating the work, as in a lathe, while holding the tool against rotation, and the claims are intended to cover the tool used in that fashion even though it has been convenient, for purposes of description, to refer to rotation of the tool, as in a drill press. When the shank of the tool is rotated, the cutter disk wobbles but does not rotate, it being restrained against rotation by the stationary work in which it is operating. When the work is rotated, and the shank of the tool is held against rotation, the cutter disk wobbles and rotates with the work, but relative rotation of the cutter disk and the work is restrained just as before. The operation is identical in either case, there being a mere reversal as to whether the work or the tool shank is rotated in order to produce the desired relative rotation of the work and tool shank.

I claim:

1. A tool for exactly sizing and burnishing a hole of nearly finished size, said tool comprising a shank, a bearing stud at the end of said shank, and a cutter disk rotatable on said stud, said disk having the full diameter of the hole, and said stud being disposed at a small angle relative to the axis of the shank in order to cause the disk to wobble.

2. A tool comprising a shank, a bearing stud at the end of said shank, and a cutter disk rotatable on said stud, said stud being disposed at a small angle relative to the axis of the shank in order to cause the disk to wobble, and the center of said disk being disposed at the intersection of the axes of the shank and stud.

3. A tool for exactly sizing and burnishing a hole of nearly finished size, said tool comprising a shank, a bearing stud at the end of said shank, and a cutter disk rotatable on said stud, said disk having the full diameter of the hole, and the bottom face of said disk being concaved at an angle to the plane of the disk in order to form a cutting edge having an angle less the 90° at the periphery of the disk, said bearing stud being disposed at an angle relative to the axis of the shank in order to cause the disk to wobble.

4. A hole sizing tool for exactly sizing and burnishing a hole of nearly finished size, said tool comprising a shank, a bearing stud at the end of said shank, and a cutter disk rotatable on said stud, said disk having its edge curved to conform to the diametrical part of the surface of a sphere having a radius equal to the radius of the desired hole, said bearing stud being disposed at an angle relative to the axis of the shank in order to cause the disk to wobble.

5. A hole sizing tool for exactly sizing and burnishing a hole of nearly finished size, said tool comprising a shank, a bearing stud at the end of said shank, and a cutter disk freely rotatable on said stud, said disk having its edge curved to conform to the diametrical part of the surface of a sphere having a radius equal to the radius of the desired hole, the bottom face of said disk being concaved at an angle to the plane of the disk in order to form a continuous cutting edge having an angle less than 90° at the periphery of the disk, said bearing stud being disposed at an angle relative to the axis of the shank in order to cause the disk to wobble.

6. A hole sizing tool comprising a shank, a bearing stud projecting therefrom, a cutter disk freely rotatable on said stud, means to hold said disk assembled on the stud, said disk having its edge curved to conform to the diametrical part of the surface of a sphere having a radius equal to the radius of the desired hole, said bearing stud being disposed at an angle relative to the axis of the shank in order to cause the disk to wobble, the axis of said shank and the axis of said stud intersecting in the plane of the disk, said disk being of appreciable thickness in order to provide supporting stock above the plane of the disk and sharpening stock below the plane of the disk.

7. A metal working tool for exactly sizing and burnishing a hole of nearly finished size, said tool comprising a shank one end of which is provided with a thrust bearing face and a bearing stud projecting perpendicularly from said face, a cutter disk freely rotatable on said stud, said disk being formed integrally with a hub adapted to bear against said bearing face as a thrust bearing and against said stud as a radial bearing, releasable means to hold said hub on the stud, said stud being disposed at an angle relative to the axis of the shank with the center of said disk located at the intersection of the axes of the shank and stud.

8. A metal working tool comprising a shank one end of which is provided with a thrust bearing face and a bearing stud projecting perpendicularly from said face, a circular cutter disk freely rotatable on said stud, said disk having a smooth continuous edge and being formed integrally with a hub adapted to bear against said bearing face as a thrust bearing and against said stud as a radial bearing, means to hold said disk assembled on the stud, the bottom face of said disk being concaved at an angle to the plane of the disk in order to form a cutting edge at the periphery of the disk, said bearing stud being disposed at an angle relative to the axis of the shank in order to cause the disk to wobble, the axis of said shank and the axis of said stud intersecting in the plane of the disk.

9. A metal working tool comprising a shank one end of which is provided with a thrust bearing face and a bearing stud projecting perpendicularly from said face, a cutter disk freely rotatable on said stud, said disk being formed integrally with a hub adapted to bear against said bearing face as a thrust bearing and against said stud as a radial bearing, means to hold said disk assembled on the stud, said bearing stud being disposed at an angle relative to the axis of the shank in order to cause the disk to wobble, the axis of said shank and the axis of said stud intersecting in the plane of the disk, said disk being of appreciable thickness in order to provide supporting stock above the plane of the disk and sharpening stock below the plane of the disk.

10. A hole sizing tool comprising a shank one end of which is provided with a thrust bearing face and a bearing stud projecting perpendicularly from said face, a circular cutter disk freely rotatable on said stud, said disk being formed integrally with a hub adapted to bear against said bearing face as a thrust bearing and against said stud as a radial bearing, means to hold said disk assembled on the stud, said disk having its edge curved to conform to the diametrical part of the surface of a sphere having a radius equal to the radius of the desired hole, the bottom face of said disk being concaved at an angle to the plane of the disk in order to form a smooth continuous circular cutting edge at the periphery of the disk, said bearing stud being disposed at an angle relative to the axis of the shank in order to cause the disk to wobble, the axis of said shank and the axis of said stud intersecting in the plane of the disk, said disk being of appreciable thickness in order to provide supporting stock above the plane of the disk and sharpening stock below the plane of the disk.

11. A tool for exactly sizing and burnishing a hole of nearly finished size, said tool comprising a shank, a bearing stud at the end of said shank, and a cutter disk freely rotatable on said stud, said disk having a continuous circular cutting edge, said stud being disposed at a small angle relative to the axis of the shank with the center of said disk located at the intersection of the axes of the shank and stud, and said disk having the full diameter of the hole, whereby the disk is caused to wobble without substantial rotation relative to the hole.

12. A tool for exactly sizing and burnishing a hole of nearly finished size, said tool comprising a shank, a bearing stud at the end of said shank, and a cutter disk freely rotatable on said stud, the bottom face of said disk being slightly concaved to form a continuous circular cutting edge at the periphery of the disk, said edge having an angle somewhat less than ninety degrees, said stud being disposed at a small angle relative to the axis of the shank with the center of said disk located at the intersection of the axes of the shank and stud, and said disk having the full diameter of the hole, whereby the disk is caused to wobble without substantial rotation relative to the hole.

13. A tool for exactly sizing and burnishing a hole of nearly finished size, said tool comprising a shank, a bearing stud at the end of said shank, and a cutter disk freely rotatable on said stud, said disk having its edge curved to conform to the diametrical part of the surface of a sphere having a radius equal to the radius of the desired hole, and said stud being disposed at a small angle relative to the axis of the shank with the center of said disk located at the intersection of the axes of the shank and stud, whereby the disk is caused to wobble without substantial rotation relative to the hole.

14. A tool for exactly sizing and burnishing a hole of nearly finished size, said tool comprising a shank, a bearing stud at the end of said shank, and a cutter disk freely rotatable on said stud, said disk having its edge curved to conform to the diametrical part of the surface of a sphere having a radius equal to the radius of the desired hole, the bottom face of said disk being slightly concaved to form a continuous circular cutting edge at the periphery of the disk, said edge having an angle somewhat less than ninety degrees, and said stud being disposed at a small angle relative to the axis of the shank with the center of said disk located at the intersection of the axes of the shank and stud.

GEORGE HARRISON.